Sept. 8, 1931.  E. EGER  1,822,568
INNER TUBE PROTECTOR
Filed Jan. 30, 1929
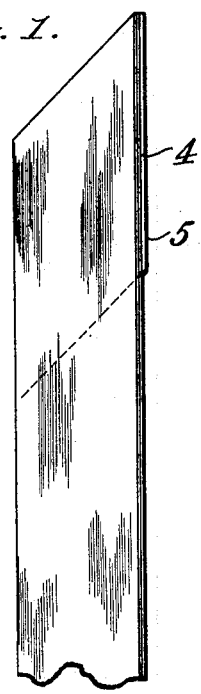
Fig. 1.
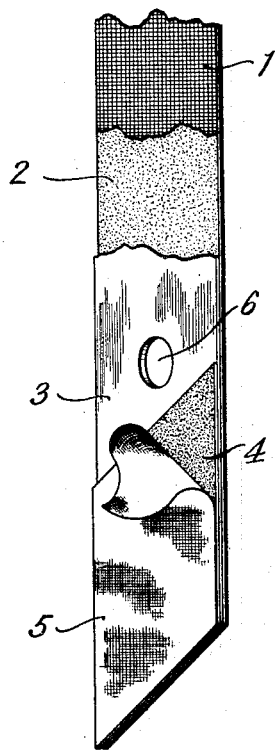
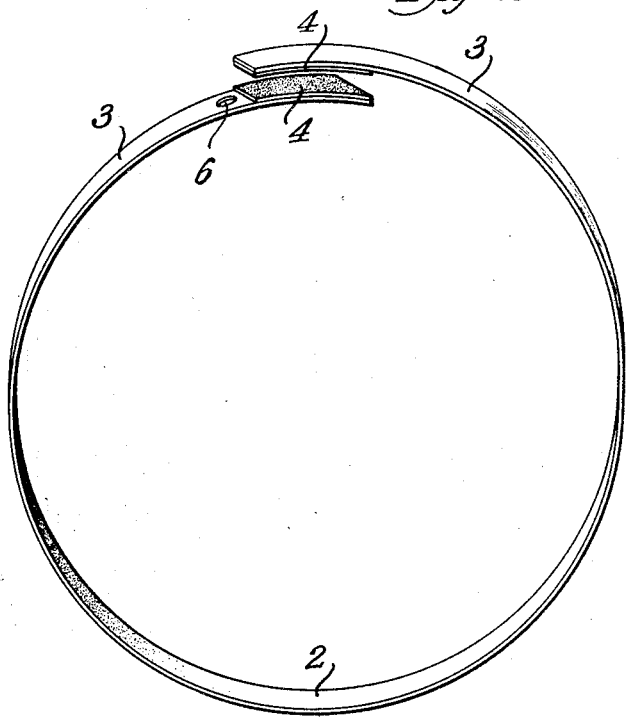
Fig. 2.
Fig. 3.
INVENTOR.
Ernst Eger
BY
ATTORNEY Patented Sept. 8, 1931

1,822,568

UNITED STATES PATENT OFFICE

ERNST EGER, OF DETROIT, MICHIGAN, ASSIGNOR TO MORGAN & WRIGHT, OF DETROIT, MICHIGAN, A CORPORATION OF MICHIGAN

INNER TUBE PROTECTOR

Application filed January 30, 1929. Serial No. 336,099.

This invention concerns a protective strip adapted to be applied to the well of a pneumatic tire rim to prevent injuries to the inner tube.

Among other novel features, the invention provides a rim strip which is easy to attach, inexpensive to manufacture, and wherein there is presented to the inner tube a smooth fitting surface which materially preserves the useful life of the tube.

In carrying out the invention, there is provided preferably a strip of fabric which is treated with a suitable friction compound applied as a filler for the fabric and over which there is applied on one side of the strip a skim coat of uncured rubber composition. The strip carries at each end a pad of tacky gum, the pads being each provided with a temporary covering, such as Holland cloth. The strip is attachable to the rim by simply removing the Holland coverings from the tacky pads and drawing the strip around the rim by hand, the skim coat faced outward, and pulling the strip firmly down into the well, after which the pads are stuck together. The fabric backing thus holds the strip from stretching circumferentially of the rim, and the rubber comprising the uncured skim coat will flow due to the pressure of the tube, thereby thinning out the edges of the strip and causing the strip to shape itself to the rim and to give a natural and smooth contact between the tube and the rim strip. The skim coat is of suitable compounded ingredients such that it will dry enough in use to prevent sticking to the tube. Rim strips heretofore known in the art were of cured rubber and had a tendency to wear away the tube at the abrupt edges of the cured strip, thus causing premature failure of the tube. This fault is entirely overcome in the present invention.

Other features and advantages will become apparent upon consideration of the following specification and the accompanying drawings, in which:

Figure 1 is a perspective view of the protective rim strip with portions broken away to show its construction;

Fig. 2 illustrates the manner in which the strip is looped around in the well of a tire rim prior to sticking the tacky pads together; and Fig. 3 is a transverse section of the rim strip in position within a tire rim.

In the drawings, which represent one practical embodiment of the invention, the reference numeral 1 indicates a strip of woven or other suitable fabric which is impregnated on one or both sides with a rubberized filler 2 of suitably compounded ingredients such that it may be applied relatively dry to the fabric 1. Over the filler 2, preferably on one side only of the strip, there is provided a skim coat 3 of uncured rubber composition which extends from end to end of the strip. A pair of pads 4, one at each end of the strip, are composed of tacky gum, such as bologna, and each is provided with a temporary cover 5 of Holland cloth. A valve-stem hole 6 may be provided in any convenient location in the strip.

The strip thus formed is adapted to encircle a tire rim, such as that indicated at 7, and be drawn down, by hand, under tension into the well 8 of the rim, the skim coat 3 faced outward, as indicated in Fig. 3, the Holland covers having been removed, and then the tacky pads 4 spliced together to secure the ends of the strip together around the rim. The ends of the strip may be and preferably are skived to produce a smooth joint.

Owing to the uncured condition of the skim coat 3, it is plastic and will flow under the pressure of an inflated inner tube 9 within a tire 10 mounted on the rim 7, so that the longitudinal edges of the skim coat 3 will be thinned out and will shape themselves against the adjacent portions of the rim wall, and thereby present a smooth and unbroken surface to the tube, thus precluding any possibility of causing rupture, which has heretofore been a fault in rim strips in which the rubber was cured before placing on the rim, and which consequently presented sharp abrading edges to the tube.

The fabric 1 is preferably a square woven fabric and it has been found that a fabric of about 8 oz. and having a thread count of 32 x 32, is satisfactory, although any other fabric and weave may be used if desirable, as long as it possesses enough strength to withstand hand tension when placing the strip upon the rim. The filler for the fabric is preferably a ground friction filler containing fibrous material which is applied to the fabric 1 in any approved manner. The filler is preferably run dry into the fabric 1 and is suitably compounded so that it will not have a tendency to cause sticking in use. By thus applying the filler in a substantially dry condition curing thereof is unnecessary. Although any filler compound may be used conforming to the foregoing characteristics, a typical formula is given below as follows:

100 pounds shoddy (reclaimed rubber)
48 pounds ground scrap (pulverized or ground vulcanized rubber)
38 pounds whiting
36 pounds mineral rubber
8 pounds sulphur 230 pounds The foregoing formula is also suitable for the uncured gum comprising the skimcoat 3.

For the tacky pads 4, the following formula may be used:

15 pounds smoked sheet
15 pounds 12 ounces crepe (unsmoked rubber)
1 pound 14 ounces M. B. = 4 parts plantation rubber, 1 part heptene (condensation product of heptaldehyde aniline)
25 pounds lithopone
6 pounds litharge
3 pounds carbon black
2 pounds mineral rubber
2 pounds lime
2 pounds light spindle oil
4 pounds sulphur 76 pounds 10 ounces While the foregoing formulas have been found satisfactory, it is obvious that others may be used which will provide a body or skim coat 3 of uncured rubber composition adapted to flow under tube pressure, whereby to shape itself to the well of the rim and the tube, and be non-adhering thereto in use, and pads which tenaciously grip the ends of the strip together around the rim. It is also clear that the strip may be altered in proportion and size without departing from the spirit of the invention, as defined in the appended claims.

Having thus described my invention, what I claim and desire to protect by Letters Patent is:

1. As a new article of manufacture, a protective strip adapted to encircle the well of a tire rim, said strip having a coating of uncured non-adhesive gum adapted to face an inflation tube on said rim, said gum being of a plastic composition so that it will flow under the pressure of said tube without adhering thereto.

2. A strip for protecting the inner tubes of tires when mounted on rims comprising a layer of strain-resisting material extending from end to end substantially of the strip and having one surface of non-adhesive uncured plastic rubber composition capable of being deformed and thinned to a feather edge by the pressure within the inflated inner tube without adhering thereto so as to prevent removal of the inner tube, and means for securing the strip snugly about the rim and with its ends permanently united.

Signed at Detroit, county of Wayne, State of Michigan, this 24th day of January, 1929.

ERNST EGER.